United States Patent [19]

Dohmeier et al.

[11] Patent Number: 5,612,938
[45] Date of Patent: Mar. 18, 1997

[54] CORRECTING RECORDED MARKS AND LAND LENGTHS TAKEN FROM AN OPTICAL DISK

[75] Inventors: Steven C. Dohmeier; Michael Meichle, both of Rochester; Michael G. Fairchild, Webster, all of N.Y.

[73] Assignee: Eastman Kodak Company, Rochester, N.Y.

[21] Appl. No.: 425,549

[22] Filed: Apr. 20, 1995

[51] Int. Cl.⁶ ............................................. G11B 5/09
[52] U.S. Cl. ........................... 369/48; 369/59; 360/51
[58] Field of Search ........................ 369/59, 124, 54, 369/58, 47, 48; 360/51

[56] References Cited

U.S. PATENT DOCUMENTS

| 4,734,900 | 3/1988 | Davie | 369/59 |
| 5,204,848 | 4/1993 | Cardero et al. | 369/59 X |
| 5,502,711 | 3/1996 | Clark et al. | 369/59 X |

*Primary Examiner*—Georgia Y. Epps
*Assistant Examiner*—P. W. Huber
*Attorney, Agent, or Firm*—Raymond L. Owens

[57] ABSTRACT

Method for correcting the length of marks and lands representing information taken from an optical disk is disclosed. The method includes digitizing amplified analog data having marks and lands played back from an optical disk and providing a data synchronization clock by using a phase lock loop (PLL). The method further includes providing an adjustment to a threshold signal level based upon the difference in timing position in mark and land edge marks with reference to the data synchronization clock and changing the data mark and land lengths with reference to the adjusted threshold signal.

4 Claims, 7 Drawing Sheets

CORRECTING RECORDED MARKS AND LAND LENGTHS TAKEN FROM AN OPTICAL DISK

FIELD OF INVENTION

The present invention relates to optical disk and more importantly to a method of correcting pulse length modulated information recorded on such disk.

BACKGROUND OF THE INVENTION

There is a need in reading information from an optical disk which is to provide correction of distorted mark and land lengths. A systematic error is that which affects all consecutive mark edge positions in a predictable way over some period of time, generally greater than two bytes. In an optical recording system, systematic error is caused by the following: focus and tracking errors, write power error, media sensitivity variation, optical aberrations, and stamper imperfections in the case of etched or molded media. Systematic mark length error is a problem because it limits the data capacity and reliability that can be achieved for a given system.

The current state of the art uses multiple phase locked loops (PLLs) or a single phase locked loop as a data edge position reference for detecting length errors. Reference is made to assigned U.S. Pat. No. 4,734,900 granted Mar. 29, 1988 to IBM entitled "Restoring And Clocking Pulse Width Modulated Data."

The basis of a PLL data correction circuit is to monitor the timing difference between the played back data edges, and the previously synchronized data clock generated by the PLL. The detected timing difference or "error" is then fed back into the circuit to provide a way for changing the data edge positions. Conventionally, the PLL positions the clock edges to equalize the timing difference between the leading data edge and clock edge and the trailing data edge and clock edge. This relationship can be used to measure systematic error in the length of the data. When there is a length error, the leading and trailing data edges are offset in equal and opposite directions relative to the clock edges. The direction and length of the error can be determined by the relative position of the data edges (leading or trailing) to the clock edges. A duty cycle correction circuit measures these data and clock edge position differences and feeds the correction back into the data channel in either open or closed loop configurations. The maintenance of ideal edge positions i.e. when clock and data edges are superimposed, provide maximum margin for any single edge to leave the detection window causing a bit error. As a result, the number of bit errors produced by the system is minimized.

There are three fundamental correction techniques outlined in the IBM patent. In this patent, the first is a dual phase locked loop approach wherein a first phase lock loop PLL A is locked to the leading edges of the pulse length modulated data, and a second phase lock loop PLL B is locked to the trailing edges of the data. An error signal is then generated by monitoring the phase difference between the two clock signals generated by the PLL's A and B. The problems with a multiple phase lock loop (PLL) approach are complexity, and opportunity for interactions between the loops causing oscillations. A second technique described employs a single PLL, however, it utilizes two one shot multivibrators to provide the corrected data signal, one fixed and one variable. The problem with this solution is that "one shots" are very unstable devices where response varies greatly with temperature and component variations making the solution unstable and inconsistent. A second problem with this approach is that only one edge is being shifted relative to the clock forcing the PLL to adjust as the data lengths are being corrected. If two 'one shots' were used, one per edge, the variation in response of each 'one shot' with respect to the other could result in very different leading and trailing edge position responses to timing errors. This solution can lead to residual length errors, instability and interaction when submitted to certain disturbances. Correction bandwidth will be limited to PLL response. A third technique described uses a very high speed clock and counter to monitor the data edge position relative to the system clock edge to generate an error signal. This system has the problem of requiring a very high frequency clock, on the order of fifty times the data rate. Clock frequencies of this order will cause electromagnetic interference (EMI) and other problems that would be extremely difficult and costly to contain in a computer peripheral environment.

SUMMARY OF THE INVENTION

The object of this invention is to provide a solution to the problem of data mark length error correction with a single phase lock loop arrangement that provides minimum complexity and cost, and maximum reliability.

This object is achieved in a method for correcting the length of marks and lands representing information taken from an optical disk, comprising the steps of:

a) digitizing amplified analog data having marks and lands played back from an optical disk;

b) providing a data synchronization clock by using a phase lock loop (PLL);

c) providing an adjustment to a threshold signal level based upon the difference in timing position in mark and land edges with reference to the data synchronization clock; and d) changing the data mark and land lengths with reference to the adjusted threshold signal.

Advantageous Effect of the Invention

The following are advantages of the present invention. This invention is not inhibited by charge constrained codes. It functions equally well with or without DC content. The error detector provides a true differential error signal with no 'dead band' due to gate setup times commonly found in other digital solutions. The phase limit detector provides a robust means for determination of correction polarity. This circuit allows mark length correction to continue even while the PLL is not completely locked. The edge shifter provides for leading and trailing edges to be positioned simultaneously allowing the PLL to remain undisturbed by the data correction process.

DETAILED DESCRIPTION OF THE PREFERRED EMBODIMENTS

Figure 1:
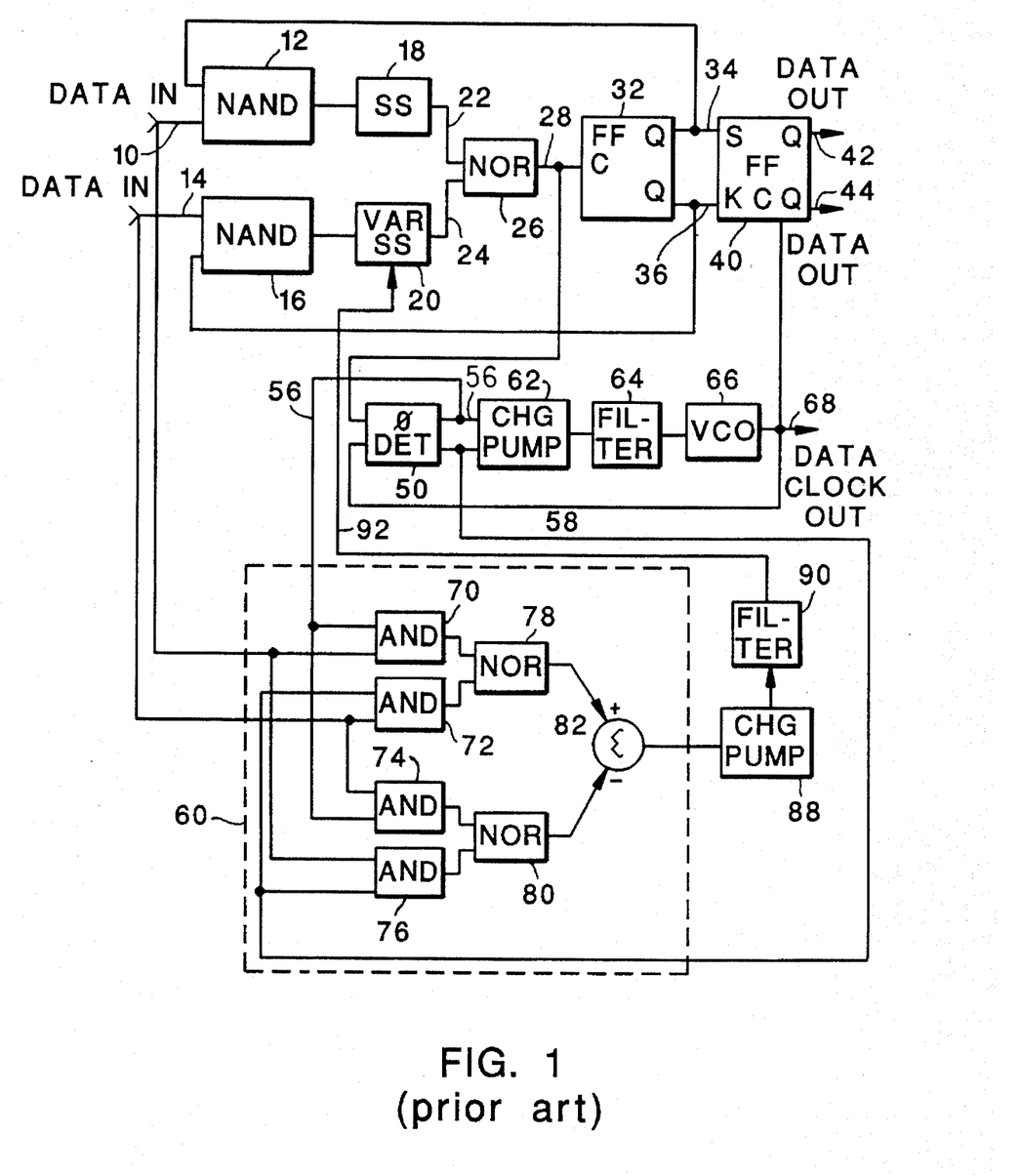
FIG. 1 is a block diagram of a prior art system shown as FIG. 1 in the previously referenced IBM patent.

FIG. 1 is a block diagram illustrating prior art technique. Signals "DATA IN", and "DATA IN NOT" are input into the circuit. NAND blocks 12 and 16 pass leading and trailing edges respectively. Signals passed from NAND blocks 12 and 16 fire single shots 18 and 20, these signals are passed by NOR 26 to trigger flip flop 32. The leading edge signal provides a fixed delay before triggering the flip flop 32 while the trailing edge signal provides a variable delay before triggering the flip flop 32. The variable delay provides the means for changing the timing length of the data. All length correction takes place via the trailing edge. Flip flop 40 provides the means for resynchronizing the corrected data with the phase lock loop clock providing optimized signals for the decoder. Further explanation is outside the scope of this article.

The phase lock loop is a conventional charge pump PLL including a phase detector 50, charge pump 62, filter 64, and voltage controlled oscillator (VCO) 66. The phase comparator first compares the phase difference between the incoming data and the existing VCO clock edge positions, then converts the edge differences into a sequence of digital signals, (one per data edge), that are input into a bipolar charge pump 62. The charge pump 62 then provides current to an integrating capacitor for a period of time proportional to timing differences between the data edges and the PLL clock edge. For example, a difference between the leading data edge and clock would result in one polarity of current to the integrator, while the trailing data edge difference supplies the inverse polarity of current. The total current integration then results in a voltage that is input to the VCO. The VCO converts the input voltage to a change in clock output frequency that is fed back to the phase comparator completing the loop.

Figure 2:
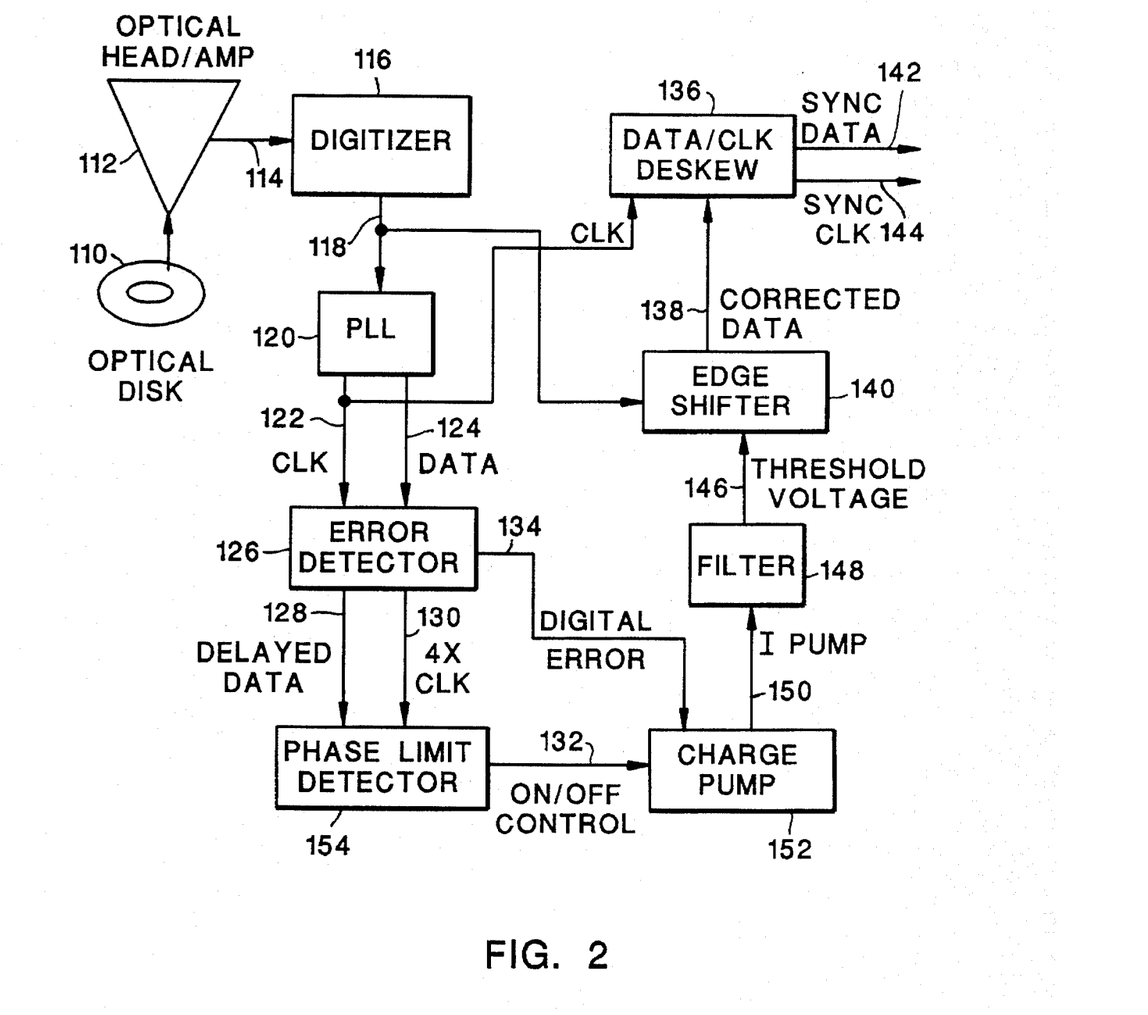
FIG. 2 is a block diagram of a first preferred embodiment of the present invention using an open loop technique.
Figure 5A:
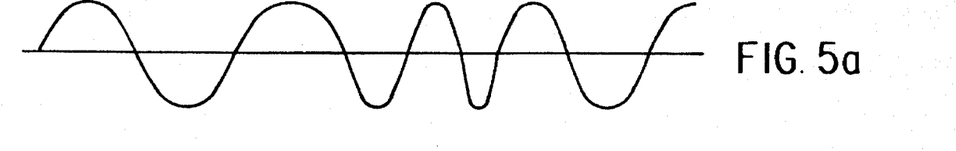
FIGS. 5a–5b shows representative waveforms into and out of the digitizer shown in FIG. 4.
Figure 5B:
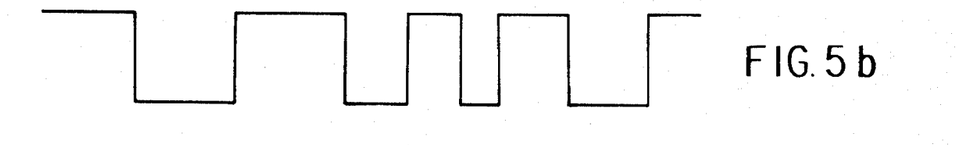
Figure 6A:
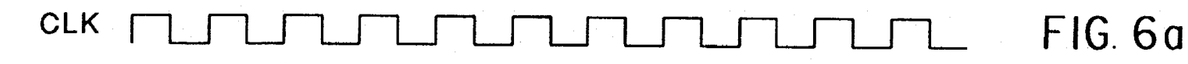
FIGS. 6a–6i illustrate the relationships between signals from the PLL, and error detector of FIG. 2.
Figure 6B:
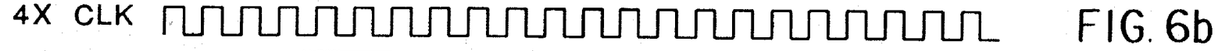
Figure 6C:
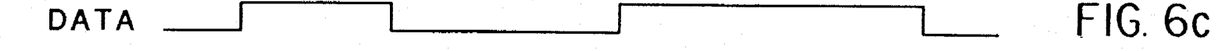

FIG. 2 illustrates a first preferred embodiment. The structure shown in FIG. 2 is open loop with respect to the PLL. Optical head 112 reads data from disk 110 and produces an amplified RF analog signal 114 (FIG. 5a). The RF analog signal is digitized by a digitizer 116 and outputs a digitized data 118 (FIG. 5b) representative of the amplified RF analog signal 114. Digitized data 11B is used as a data input to a PLL circuit 120 that produces a synchronized clock (CLK) 122, and data signals (DATA) 124 (see FIGS. 6a and 6c, respectively).

Figure 6D:
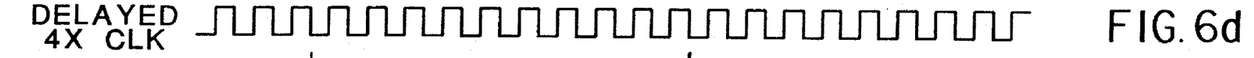
Figure 6E:
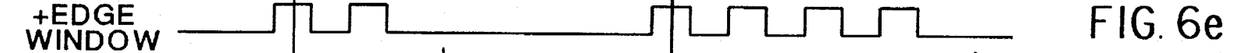
Figure 6F:
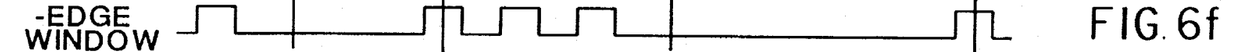
Figure 6G:
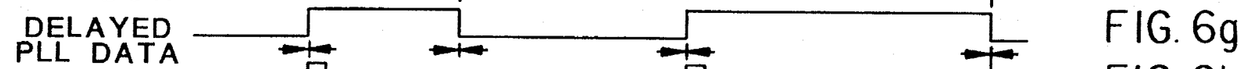
Figure 6H:
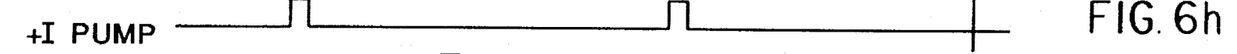
Figure 6I:
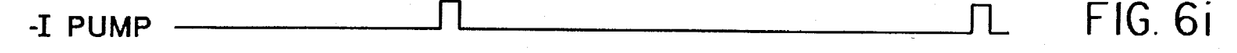

This PLL circuit 120 and synchronized clock 122 are input into an error detector 126. The error detector 126 produces a digital error signal 134 that is proportional to the timing difference between the synchronized clock 122 and data signals 124. The error detector 126 creates this error signal by first producing two signals: a 4×CLK, and a Delayed 4×CLK (see FIGS. 6b and 6d, respectively). These 4×CLK signals each clock D flip flops A and B (not shown) with PLL DATA (FIG. 6c) and inverted PLL DATA (not shown) as the D inputs respectively. The output of flip flop A results in +EDGE WINDOW (FIG. 6e) and the second flip flop B results in –EDGE WINDOW (FIG. 6f). A delayed PLL data signal is then symmetrically positioned between +EDGE WINDOW and –EDGE WINDOW (FIGS. 6e, 6f, and 6g, respectively). Signal delays can be conventionally implemented by programmable delays; lump delays; or by tapped delay lines. Signals +I PUMP and –I PUMP (FIGS. 6h and 6i, respectively) are created when +EDGE WINDOW is clocked at flip flop C (not shown) by the positive edge of the DELAYED PLL DATA signal and –EDGE WINDOW is clocked at flip flop D (not shown) by the negative edge of the DELAYED PLL DATA signal. A combination of the +I PUMP and –I PUMP signals finally produce the digital error signal 134. The error detector 126 also outputs the delayed data signal 128 and 4× clock 130 to the phase limit detector 154.

Figure 7A:
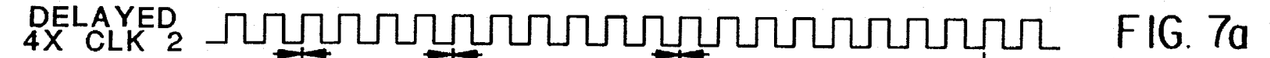
FIGS. 7a–7e illustrates timing relationships of the signals used in the phase limit detector of FIG. 2.
Figure 7B:
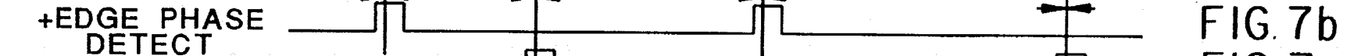
Figures 7C, 7D:
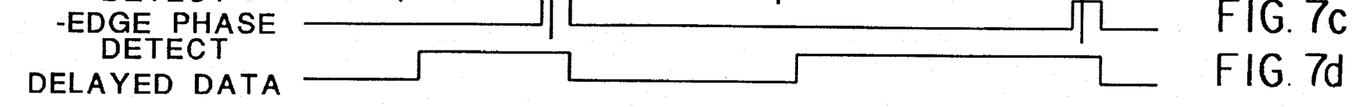
Figure 7E:
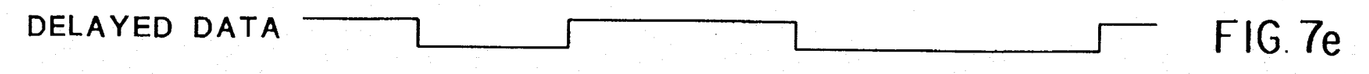

The phase limit detector 154 analyzes the phase relationship between the delayed data signal 128 and 4× clock 130 to determine if the error detector 126 is in range to provide data length correction of the correct polarity. If the phase relationship between the signals is out of bounds, the effect of further error signals is disabled. The phase limit detector 154 generates two signals for monitoring the phase relationship between the data and clock signal edges. These two signals are +EDGE PHASE DETECT and –EDGE PHASE DETECT (FIGS. 7b and 7c, respectively). These phase detect signals are created by toggling a series of flip flops (not shown) using the DELAYED DATA and DELAYED DATA NOT signals (FIGS. 7d, e). The phase limit is monitored by tapping off the 4×CLK delay line such that the rising edge of the delayed 4×CLK2 (FIG. 7A) signal is centered within the two EDGE PHASE DETECT signals. If the phase limit is exceeded, meaning the delayed 4×CLK2 edge is outside either EDGE PHASE DETECT window, the phase limit detector 154 outputs a signal 132 that disables a charge pump 152. The charge pump 152 continues to be disabled until two consecutive data edges produce delayed 4×CLK2 signals within the edge phase detect windows.

Figure 8A:
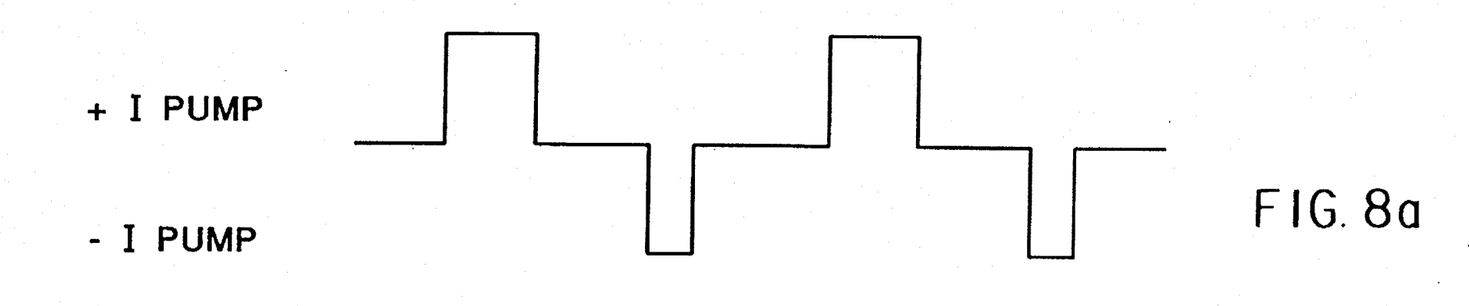
FIGS. 8a–8b describes threshold voltage changes as a function of the charge pump of FIG. 2.

The charge pump 152 is a conventional bipolar current output that produces a series of positive and negative current pulses corresponding to leading and trailing data edge positions relative to the synchronized clock 122. The charge pump 152 circuit is made up of two independent current sources. The first current source is positive and converts the +I PUMP (FIG. 6h) logic signal to a current pulse of about +10 mA. The second current source is negative and converts the –I PUMP (FIG. 6i) logic signal to a current pulse of about –10 mA. The two currents are then summed (FIG. 8a) and output to a lowpass filter 148.

Figure 8B:
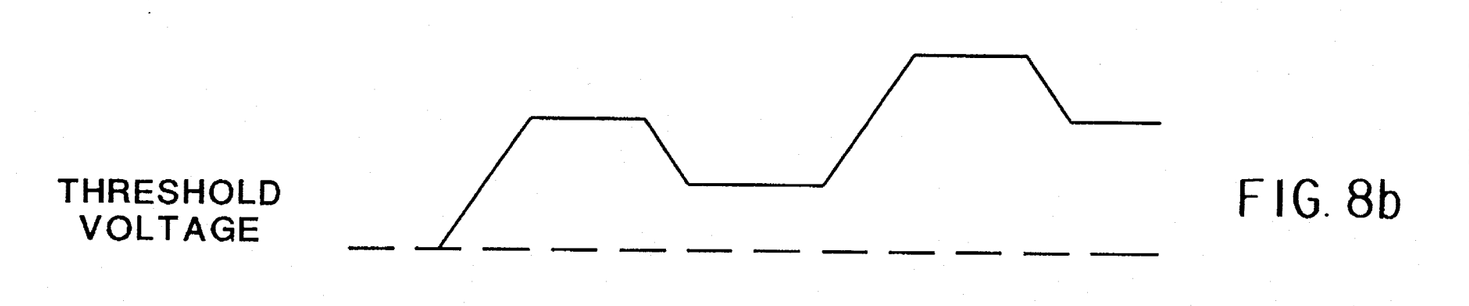
Figure 9A:
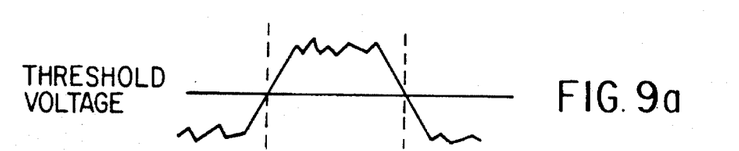
FIGS. 9a–9f illustrates changes in mark and land length that results from a change in threshold voltage of FIG. 2.
Figure 9B:
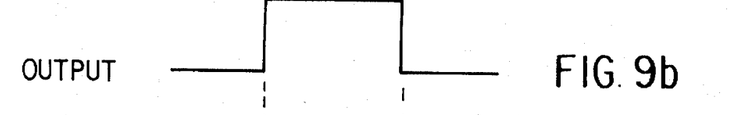
Figure 9C:
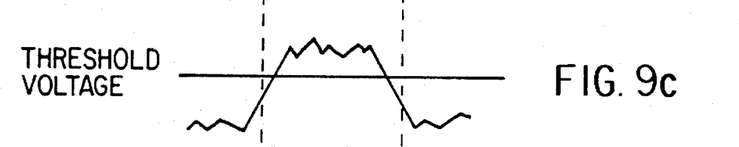
Figure 9D:
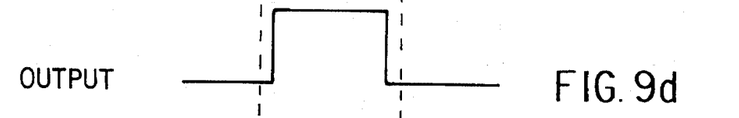
Figure 9E:
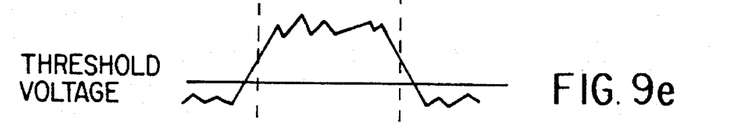
Figure 9F:
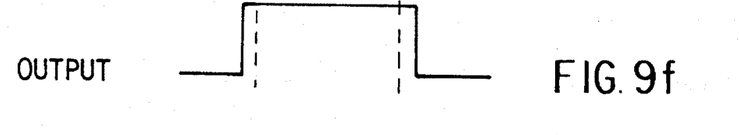

The lowpass filter 148 (which can be single or multipole) includes a capacitor (not shown) that directly integrates the bipolar current pulses providing a voltage proportional to the current (FIG. 8b). The voltage is then filtered by the lowpass filter 148 for bandwidth limiting. The output of the lowpass filter 148 is a voltage threshold signal 146 that is proportional to the I PUMP signal 150 and output to the edge shifter 140.

The edge shifter 140 provides linear sloped signals from the digitized data 118 by integrating with a capacitor; a fixed positive current source is triggered by the leading data edges and a fixed negative current source is triggered by the trailing data edges. The linear sloped signal is applied to one input of a comparator (not shown) within the edge shifter 140 and applies threshold voltage 146 the second input of the comparator in the edge shifter 140. The output of the edge shifter 140 is the corrected digital data 138. The data/clock deskew circuit 136 realigns the original synchronized clock 122 with the corrected data 138 to produce outputs sync data 142 and sync clock 144. These signals are then output to the system decoder.

Figure 3:
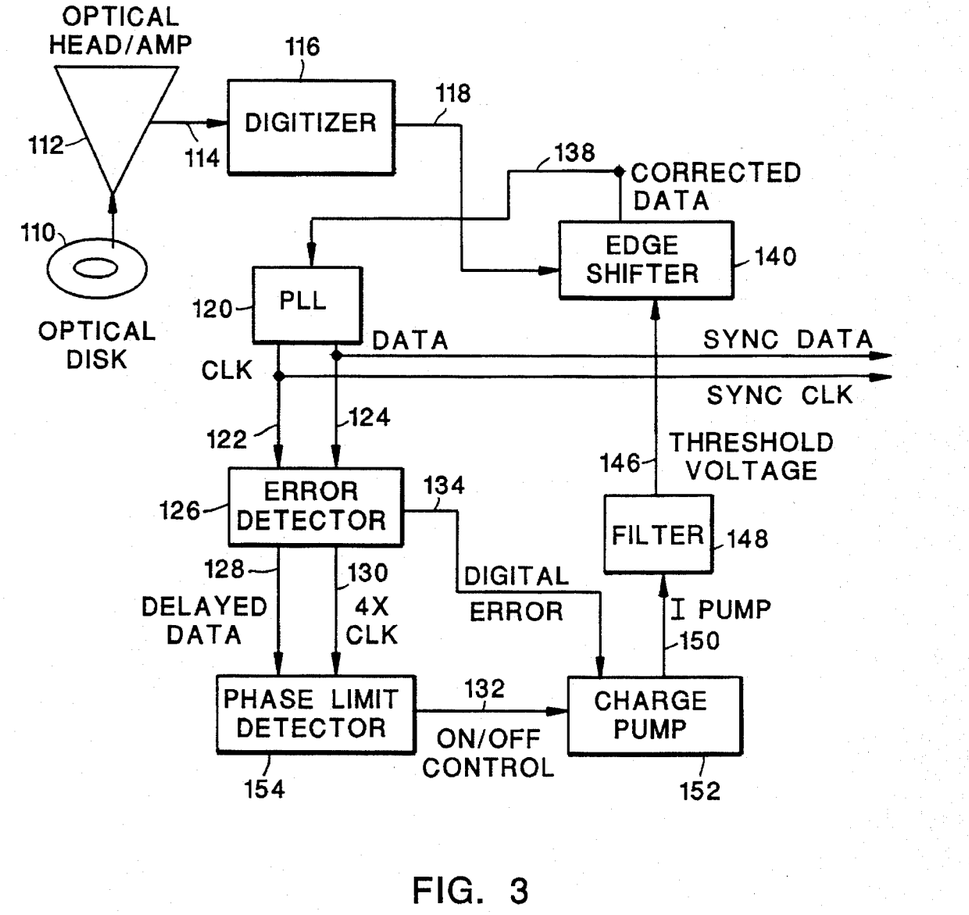
FIG. 3 is a block diagram of another embodiment of the present invention which uses a completely closed loop system.

Turning now to FIG. 3 where parts correspond to those in FIG. 2; they will show the same number. It should be noted that the corrected digital data 138 replaces the digitizer output 118 as the input to the PLL circuit 120. Because of this structural difference, the system does not require the data/clock deskew circuit 136. The deskew process occurs when corrected digital data 138 is synchronized with the PLL clock within the PLL circuit 120. The PLL outputs, synchronized clock 122, and data 124 become system outputs, sync clock, and sync data. This solution is closed loop with respect to the PLL circuit 120.

Figure 4:
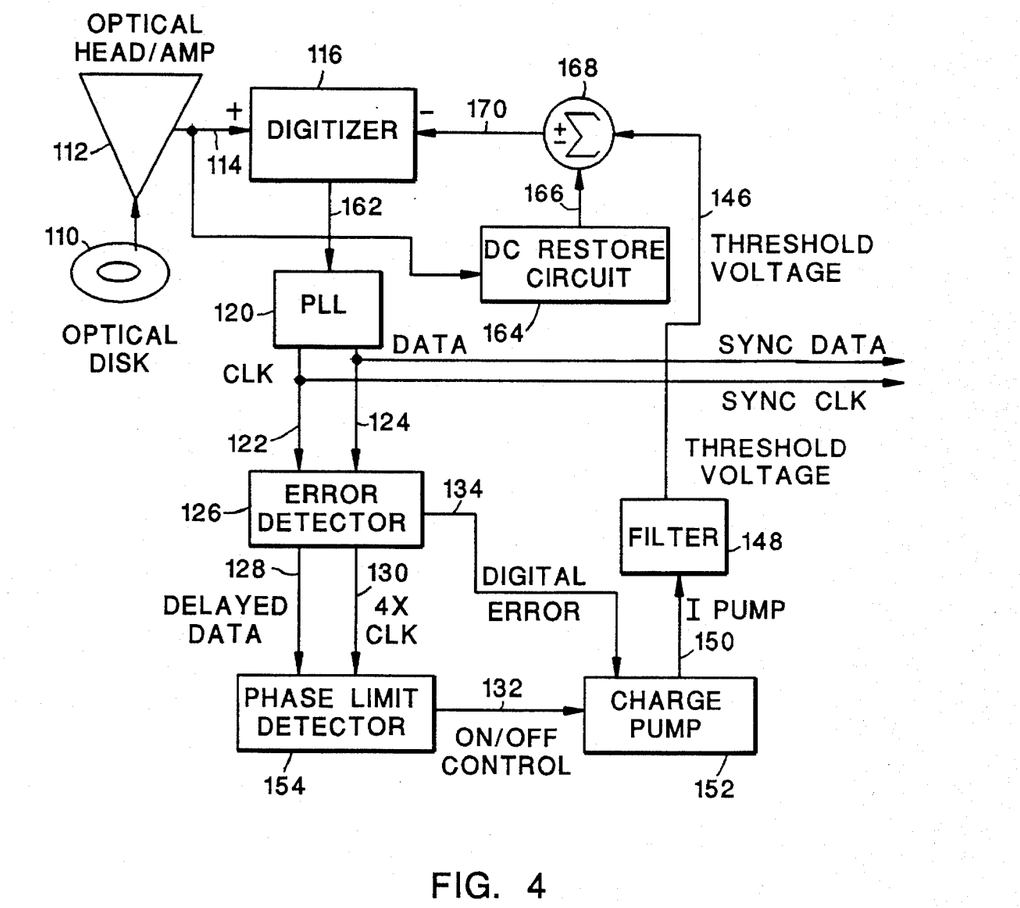
FIG. 4 is a block diagram of still another embodiment of the present invention which also uses a closed loop system that eliminates the edge shifter, and instead uses the amplified analog signals from an optical head for changing mark and land length.

Turning now to FIG. 4, the amplified RF analog signal 114 of the optical head 112 is applied to a digitizer circuit 116 and also to a DC restore circuit 164. The digitizer circuit 116 provides a digital data signal 162 to the PLL circuit 120. Also included is a summing circuit 168 which receives an input from the lowpass filter 148 and the DC restore circuit 164. The remaining parts are similar to those shown in FIG. 2. The operation of this embodiment will now be described. In this configuration, also closed loop with respect to the PLL circuit 120, the amplified RF analog signal 114 is sent to one input of a digitizer circuit 116 and a DC restore circuit 164. The DC restore circuit 164 is designed to produce an average low pass voltage of the amplified RF analog signal 114. The lowpass voltage is found by the relationship approximated by $$\frac{(Vpk) + (Vpk-)}{2}$$

wherein Vpk is the positive voltage peak and Vpk- is the negative voltage peak. This lowpass DC restore output signal 166 from the DC restore circuit 164 is generated from the amplified RF analog signal 114 to provide a starting voltage for the reference terminal of digitizer circuit 116. A digital data signal 162 is produced by digitizer circuit 116. After the digital data signal 162 passes through the rest of the circuitry described in the first embodiment, a threshold voltage 146 is produced by the lowpass filter 148. Threshold voltage 146 is proportional to the mark and land length error produced by previously described circuitry. Threshold voltage 146 is then summed at summing circuit 168 with the lowpass DC restore output signal 166. The summed correction voltage 170 provided to the reference terminal of digitizer circuit 116 results in length corrected digital data signal 162 at PLL circuit 120. The output of the digital data signal 162 becomes the corrected data that is output to the PLL circuit 120. The PLL circuit 120 then synchronizes the clock and digital data signal 162 producing synchronized clock 122 and data signals 124. These signals become sync clock 144 and sync data 142. This solution is also closed loop with respect to the PLL circuit 120.

The invention has been described in detail with particular reference to certain preferred embodiments thereof, but it will be understood that variations and modifications can be effected within the spirit and scope of the invention.

| PARTS LIST | |
|---|---|
| 12 | NAND block |
| 16 | NAND block |
| 18 | single shot |
| 20 | single shot |
| 26 | NOR |
| 32 | flip flop |
| 40 | flip flop |
| 50 | phase detector |
| 62 | charge pump |
| 64 | filter |
| 66 | voltage controlled oscillator |
| 110 | disk |
| 112 | optical head |
| 114 | amplified RF analog signal |
| 116 | digitizer |
| 118 | digitized data |
| 120 | PLL circuit |
| 122 | synchronized clock |
| 124 | data signals |
| 126 | error detector |
| 128 | delayed data signal |
| 130 | clock |
| 132 | signal |
| 134 | digital error signal |
| 136 | data/clock deskew circuit |
| 138 | corrected digital data |
| 140 | edge shifter |
| 142 | sync data |
| 144 | sync clock |
| 146 | threshold voltage |
| 148 | lowpass filter |
| 150 | I PUMP signal |
| 152 | charge pump |
| 154 | phase limit detector |
| 162 | digital data signal |
| 164 | DC restore circuit |
| 166 | lowpass DC restore output signal |
| 168 | summing circuit |
| 170 | summed correction voltage |

We claim:

1. A method for correcting the length of marks and lands representing information taken from an optical disk, comprising the steps of:

a) digitizing amplified analog data having marks and lands played back from an optical disk;

b) providing a data synchronization clock by using a phase lock loop (PLL);

c) providing an adjustment to a threshold signal level based upon the difference in timing position in mark and land edges with reference to the data synchronization clock;

d) providing mark and land length data with reference to the data synchronization clock and monitoring the phase relationship between the data synchronization clock and mark and land data to insure the polarity of the adjustment is correct;

e) changing the data mark and land lengths with reference to the adjusted threshold signal; and f) preventing changing the data mark and land lengths if the monitoring step determines that a phase limit is exceeded.

2. The method of claim 1 wherein the threshold adjustment is created by providing a mark and land length error signal using the PLL and synchronizing clock signals and supplying the error signal to a charge pump that in turn produces the variable threshold.

3. The method of claim 1 wherein the phase lock loop is responsive to digitized analog data signals.

4. The method of claim 1 wherein the phase lock loop is responsive to corrected mark and land data.

* * * * *